Patented Sept. 19, 1933

1,927,102

UNITED STATES PATENT OFFICE

1,927,102

INSULATING AND OTHER STRUCTURE COMPRISING VERMICULITE

Glenn Sucetti, Kalispell, Mont., and Roland M. Kohr, Middletown, Ohio

No Drawing. Application April 13, 1931
Serial No. 529,790

12 Claims. (Cl. 106—18)

Our invention relates to an insulating material for wall construction and similar purposes composed of vermiculite, preferably in the expanded form, as hereinafter set forth, combined with colloidal and non-colloidal clays such as bentonite.

It has been found that when bentonite has been added to vermiculite as a binder that the resulting product which is comparatively light in weight, is exceedingly strong and durable and forms a perfect insulating material such as can be made into brick or structural work.

Our material also has extremely marked sound absorbing and deadening properties. The reasons why this is so are not entirely obvious. Sound is a longitudinal displacement of air and it might be thought a material which may be comparatively reached would not possess such properties in the marked degree noted by us. We think that the properties which we have noted in the material are due, not alone to its porous character, but also to the relative elasticity of the structure of the mass whereby sound waves seem to be perfectly absorbed.

Our product is not only valuable for the purposes above mentioned, but also and possibly for the same reasons makes an excellent material to be used in the construction of automobile mufflers. Mufflers constructed from this material have excellent properties and deaden practically all objectionable noise present in the use of a metal muffler. This material can be produced cheaply and without a great deal of labor or expensive equipment.

While different mixtures of bentonite and vermiculite may be used to form a material of proper strength, adhesive to other materials and insulation, yet it has been found that the most satisfactory product has been constructed from one part of bentonite to 20 parts of expanded vermiculite by volume; altho it is not essential that other materials be used, yet more satisfactory results are produced by adding to the mixture of bentonite and vermiculite, cement or gypsum in small quantities not to exceed probably about 3%. This makes the brick hard and there is less shrinkage in heating and cooling, as it also permits a lower temperature for setting.

It will be understood that our process is not limited to that hereinafter described, which is exemplary in its nature, but has been found to be entirely satisfactory. The bentonite is suitably prepared in any way desired, as by grinding it in a disc mill, and when prepared is mixed with vermiculite which has been heat treated as hereinafter described. The mixture is plasticized and then may either be shaped into articles of the class desired, such as insulating slabs, bricks or the like, or constructions such as the muffler hereinafter mentioned. It is then thoroughly dried and will be found to be a structure entirely adequate for the uses mentioned and others, in situations where moisture is not a factor. Where moisture is a factor, the structures, if they are first heated to between around 1300 to 1600 degrees Fahr., will be found to be entirely unaffected by moisture. It is also possible to employ our plasticized substance as a plastic paint or putty. In such uses it is not always convenient to heat treat the substance as just described. The surface of the dried plastic may, if desired, be painted or otherwise coated with waterproofing material to prevent the access of moisture thereto.

The vermiculite which is preferably used, is a natural deposit, sometimes known as zonolite, which when taken from the earth is a dark brownish, greenish or black material of semi-laminated structure, whose chemical composition is substantially as follows:

|  | Per cent |
|---|---|
| Silica | 42.8 |
| Iron oxide | 7.2 |
| Aluminum oxide | 19.0 |
| Magnesium oxide | 24.6 |
| Calcium oxide | 1.9 |
| Sodium and potassium oxide | 3.8 |
| Moisture | .7 |

When this vermiculite is heated to around 1500 degrees Fahr., its appearance and structure both change and it becomes a silver or gold color, and swells to about 22 times its ordinary size whereby its unusual properties as an insulating substance arise. When to this treated vermiculite, the bentonite is added as a binder, the resultant product is still of a leafy or porous type of structure which is an excellent insulator and whose elasticity is determined by the amount of bentonite added, and a particular mesh used as well as the temperature at which it is treated. The bentonite used is also a natural deposit whose composition is substantially as follows:

|  | Per cent |
|---|---|
| $SiO_2$ | 62.47 |
| $Fe_2O_3$ | 3.56 |
| $Al_2O_3$ | 17.64 |
| $CaO$ | 1.32 |
| $MgO$ | 2.65 |
| $Na_2O$ | 2.58 |
| $K_2O$ | .39 |
| $SO_4$ | .25 |
| Loss of ignition | 9.43 |

This bentonite is preferably dried at a temperature of about 220 degrees Fahr. for around 12 hours, and then is ground in a disc mill and the material used in whatever desired mesh. While 60 mesh material is satisfactory for some purposes, it has been found that the best material for insulating brick is 200 mesh.

As far as applicants know, it is broadly new to combine vermiculite with bentonite as a binder for any purpose and as far as is known, no insulating material has previously been produced from this composition.

As far as is presently known, bentonite is the best binder obtainable for combination with vermiculite. However, other clay-like materials either of colloidal or non-colloidal nature may be used satisfactorily.

Applicants do not wish to be limited to the use of bentonite alone as a binder, but wish to claim broadly the combination of vermiculite and bentonite or any other similar material. They also do not wish to be limited to any particular process of making the product, or to any particular quantities of materials used, and only wish to be limited as is necessitated by the prior art or as specifically set forth in the claims.

Having thus described our invention, what we claim as new and desire to secure by Letters Patent, is:—

1. An insulating material composed of vermiculite combined with bentonite as a binder.

2. An insulating material composed of vermiculite and a clay used as a binder.

3. An insulating material composed of 20 parts of vermiculite combined with one part of bentonite by volume.

4. An insulating material comprising heat treated vermiculite and a clay binder.

5. An insulating material comprising heat treated vermiculite and a clay binder, the said material being heat treated whereby it is resistant to moisture.

6. The process of making an insulating material which comprises heat treating vermiculite whereby it is caused to expand, comminuting same, mixing the same with a clay having plastic properties, plasticizing the mixture and forming the said mixture into an article.

7. The process of making an insulating material which comprises heat treating vermiculite whereby it is caused to expand, comminuting same, mixing the same with a clay having plastic properties, plasticizing the mixture, forming the said mixture into an article and subsequently heat treating the said article at least to around 1300 degrees Fahr.

8. An insulating material comprising the mineral vermiculite which has been heat treated to give it an expanded character and a clay binder, the said materials being in the state of admixture and baked to produce a brick-like article of permanent character but cellular and elastic.

9. A muffler for internal combustion engines having a wall of sound absorbing material comprising expanded vermiculite and a heat treated clay binder.

10. A composite material comprising a plasticized mixture of comminuted heat treated vermiculite and bentonite.

11. A composite material comprising a plasticized mixture of vermiculite and bentonite.

12. The process of making a composite material comprising mixing together expanded vermiculite, bentonite, and a plasticizer.

GLENN SUCETTI.
ROLAND M. KOHR.